United States Patent [19]

Blake

[11] Patent Number: 5,978,084
[45] Date of Patent: Nov. 2, 1999

[54] OPEN LOOP SIGNAL PROCESSING CIRCUIT AND METHOD FOR A FIBER OPTIC INTERFEROMETRIC SENSOR

[75] Inventor: James N. Blake, Scottsdale, Ariz.

[73] Assignee: The Texas A&M University System, College Station, Tex.

[21] Appl. No.: 08/925,005

[22] Filed: Aug. 26, 1997

[51] Int. Cl.⁶ .................................................. G01C 19/72
[52] U.S. Cl. ........................................................... 356/350
[58] Field of Search .................................. 356/350, 345; 250/227.19, 227.27

[56] References Cited

U.S. PATENT DOCUMENTS

| | | |
|---|---|---|
| 4,456,376 | 6/1984 | Carrington et al. . |
| 4,545,682 | 10/1985 | Greenwood . |
| 4,578,639 | 3/1986 | Miller . |
| 4,613,811 | 9/1986 | Vaerewyck et al. . |
| 4,615,582 | 10/1986 | Lefevre et al. . |
| 4,733,938 | 3/1988 | Lefevre et al. . |
| 4,779,975 | 10/1988 | Kim .......................................... 356/345 |
| 4,894,608 | 1/1990 | Ulmer, Jr. . |
| 4,947,107 | 8/1990 | Doerfler et al. . |
| 4,973,899 | 11/1990 | Jones et al. . |
| 5,034,679 | 7/1991 | Henderson et al. . |
| 5,051,577 | 9/1991 | Lutz et al. . |
| 5,056,885 | 10/1991 | Chinn . |
| 5,063,290 | 11/1991 | Kersey . |
| 5,133,600 | 7/1992 | Schroder ................................. 356/350 |
| 5,157,461 | 10/1992 | Page . |
| 5,181,078 | 1/1993 | Lefevre et al. . |
| 5,270,791 | 12/1993 | Lefevre et al. . |
| 5,297,436 | 3/1994 | Chan et al. . |
| 5,455,676 | 10/1995 | Nishiura et al. ......................... 356/350 |
| 5,644,397 | 7/1997 | Blake . |

OTHER PUBLICATIONS

J. Blake, et al., "In–Line Sagnac Interferometer Current Sensor," 1995 IEEE Transactions on Power Delivery, No. 1, Jan., 1996.

Deeter, Merritt N., "Fiber–optic Faraday–effect magnetic–field sensor based on flux concentrators," Applied Optics, vol. 35, No. 1, Jan. 1, 1996.

R.T. de Carvalho, J. Blake, and G. Sanders, "Sagnac Interferometers for Accurate Measurements of True Nonreciprocal Effects", *SPIE*, vol. 2070, pp. 264–269.

Kent B. Rochford, Gordon W. Day, and Peter R. Forman, "Polarization Dependence of Response Functions in 3x3 Sagnac Optical Fiber Current Sensors", *Journal of Lightwave Technology*, vol. 12, No. 8, Aug. 1994, pp. 1504–1509.

P.A. Nicati and Ph. Robert, "Stabilised Current Sensor Using Sagnac Interferometer", *IOP Publishing Ltd.*, 1988, pp. 791–796.

H. Taylor, "Fiber Sensors: 2", *U.S. Naval Research Laboratory*, Apr. 29, 1981, pp. 128–130.

P.A. Nicati and Ph. Robert, "Stabilized Sagnac Optical Fiber Current Sensor Using One Phase and Two Amplitude Modulations", *Swiss Federal Institute of Technology of Lausanne*, pp. 402–405.

(List continued on next page.)

*Primary Examiner*—Samuel A. Turner
*Attorney, Agent, or Firm*—Baker & Botts, L.L.P.

[57] ABSTRACT

A signal processing circuit (10) for a fiber optic sensor (12) includes a d.c. block (14) coupled to the fiber optic sensor (12) for removing d.c. components from the fiber optic sensor output signal, and a low pass filter (16) coupled to the d.c. block (14) for reducing noise in the fiber optic sensor output signal and generate a filtered signal. A comparator (18) is coupled to the low pass filter (16) and generates a squared signal indicative of zero crossings in the filtered signal. A lock-in amplifier or synchronous demodulator (20) is coupled to the comparator (18) and generates an output signal indicative of a phase shift in the two light waves propagating in the fiber optic sensor (12).

26 Claims, 2 Drawing Sheets

OTHER PUBLICATIONS

I.G. Clarke, D. Geake, I.M. Bassett, S.B. Poole, and A.D. Stokes, "A Current Sensor Using Spun Birefringent Fibre in a Sagnac Configuration", *OFTC, University of Sydney, Australia,* pp. 167–170.

A. Yu and A.S. Siddiqui, "A Theoretical and Experimental Investigation of a Practicable Fibre Optic Current Sensor Using Sagnac Interferometer", *Department of Electronic Systems Engineering, University of Essex,* pp. 289–292.

L.R. Veeser and G.W. Day, "Faraday Effect Current Sensing Using a Sagnac Interferometer With a 3x3 Coupler", *National Institute of Standards and Technology,* pp. 325–328.

P. Akhavan Leilabady, A.P. Wayte, M. Berwick, J.D.C. Jones, and D.A. Jackson, "A Pseudo–Reciprocal Fibre–Optic Faraday Rotation Sensor: Current Measurement and Data Communication Applications", *Elsevier Science Publishers B.V.,* pp. 173–176.

R.A. Bergh, H.C. Lefevre, and H.J. Shaw, "Geometrical Fiber Configuration for Isolators and Magnetometers", *Fiber–Optic Rotation Sensors and Related Technologies,* Springer Series in Optical Sciences 32, 1982, pp. 111–116.

Guido Frosio and Rene Dandliker, "Reciprocal Reflection Interferometer for a Fiber–Optic Faraday Current Sensor", *Applied Optics,* vol. 33, No. 25, Sep. 1, 1994, pp. 6111–6122.

R.T. de Carvalho and J. Blake, "Simultaneous Measurement of Electric and Magnetic Fields Using a Sagnac Interferometer", Texas A&M University, College Station, Texas.

F. Maystre, et al., "Magneto–optic Current Sensor Using a Helical Fiber Fabry–Perot Resonator", Springer Proceedings in Physics, vol. 44, 1989.

J.N. Ross, "The rotation of the polarization in low birefringence monomode optical bivres due to geometric effects", Qpitcal and Quantum Electronics 16, pp. 455,461, 1984.

Oho, Shigeru, Hisao Sonobe and Hiroshi Kajioka, "Time–Domain Sagnac Phase Reading in Open–Loop Fiber Optic Gyroscopes", IEICE Trans Electron, vol. E79 C. No. 11, pp. 1596–1601, Nov. 1996.

OPEN LOOP SIGNAL PROCESSING CIRCUIT AND METHOD FOR A FIBER OPTIC INTERFEROMETRIC SENSOR

TECHNICAL FIELD OF THE INVENTION

This invention is related to the field of fiber optic sensors, including fiber optic gyroscopes and fiber optic current sensors. More particularly, the present invention is related to an open loop signal processing circuit and method for a fiber optic interferometric sensor.

BACKGROUND OF THE INVENTION

A number of fiber optic sensors being commercially produced or currently under development are based on the sinusoidally modulated fiber optic interferometer. These include fiber gyroscopes, current sensors, flow sensors, and acoustic sensors. An example of a fiber optic interferometric sensor is described in U.S. Pat. No. 5,644,397, titled Fiber Optic Interferometer Circuit and Magnetic Field Sensor, and issued to Blake on Jul. 1, 1997, hereby incorporated by reference. For example, the fiber gyroscope detects rotation as a phase shift induced in the light waves due to the Sagnac effect. In current and magnetic field sensors, the phase shift in the light waves may be induced by the Faraday effect.

A common method for extracting the desired information from the sensor output is to use an "open loop" signal processing technique. Although "closed loop" signal processing techniques are known to yield superior performance over open loop techniques, the open loop techniques have the advantage of requiring only a single frequency modulator rather than the wide bandwidth modulator required in the closed loop technique.

The output from a sinusoidally modulated interferometric sensor, $I_{out}$, can be represented by:

$$I_{out} = \frac{I_o}{2} \cdot \{1 + \cos[\phi_R + \phi_m \cos(\omega t + \theta)]\} \quad (1)$$

where $\omega$ is the bias modulation frequency, $\phi_R$ is the phase shift to be measured, $\phi_m$ is the modulation depth, and $\theta$ is a phase delay uncertainty between the modulation drive signal and the output signal. The most widely used method for determining $\phi_R$ is to synchronously detect the first harmonic component of $I_{out}$. The resulting signal is $I_o J_1(\phi_m) \cos \theta \sin \phi_R$. In order to determine $\phi_R$ from this signal, it is necessary to either measure or stabilize the other three variables, $I_o$, $\phi_m$, and $\theta$. Consequently, open loop signal processing schemes commonly contain four basic circuits for determining these four parameters. Three of these circuits are synchronous demodulators for the measurement of three different harmonic levels in the output signal, and the fourth circuit is a zero-crossing or level-crossing circuit for determining $\theta$. Stable high Q filters are needed for each of the synchronous demodulators and ratioing circuits are needed for comparing the various harmonic levels. In practice, a complete demodulation circuit of this type requires well over a hundred individual electronic components and is quite expensive. Therefore, it is desirable to simplify the demodulation circuitry.

SUMMARY OF THE INVENTION

Accordingly, there is a need for an accurate signal processing circuit and method that is less expensive and complicated to implement and manufacture than conventional closed loop and open loop circuits and methods. In accordance with the present invention, a signal processing circuit and method is provided which eliminates or substantially reduces the disadvantages associated with prior circuits.

In one aspect of the invention, a signal processing circuit for a fiber optic sensor includes a d.c. block coupled to the fiber optic sensor for removing d.c. components from the fiber optic sensor output signal, and a low pass filter coupled to the d.c. block for reducing noise in the fiber optic sensor output signal and generating a filtered signal. A comparator is coupled to the low pass filter and generates a squared signal indicative of zero crossings in the filtered signal. A lock-in amplifier or synchronous demodulator is coupled to the comparator and generates a signal indicative of a phase shift in the fiber optic sensor.

In another aspect of the present invention, a method for processing the output signal from a fiber optic interferometer is provided. The invention includes the steps of removing the d.c. components from the output signal, filtering noise from the output signal and generating a filtered signal, and comparing the filtered signal with zero and generating a squared signal. The squared signal is synchronously demodulated to generate a signal indicative of a phase shift in the fiber optic interferometer.

In yet another aspect of the present invention, a method of processing a fiber optic sensor output signal includes the steps of filtering the sensor output signal to remove noise, squaring the filtered signal based on zero crossings in the filtered signal, and synchronously demodulating the squared signal.

BRIEF DESCRIPTION OF THE DRAWINGS

For a better understanding of the present invention, reference may be made to the accompanying drawings, in which.

DETAILED DESCRIPTION OF THE INVENTION

Figure 1:
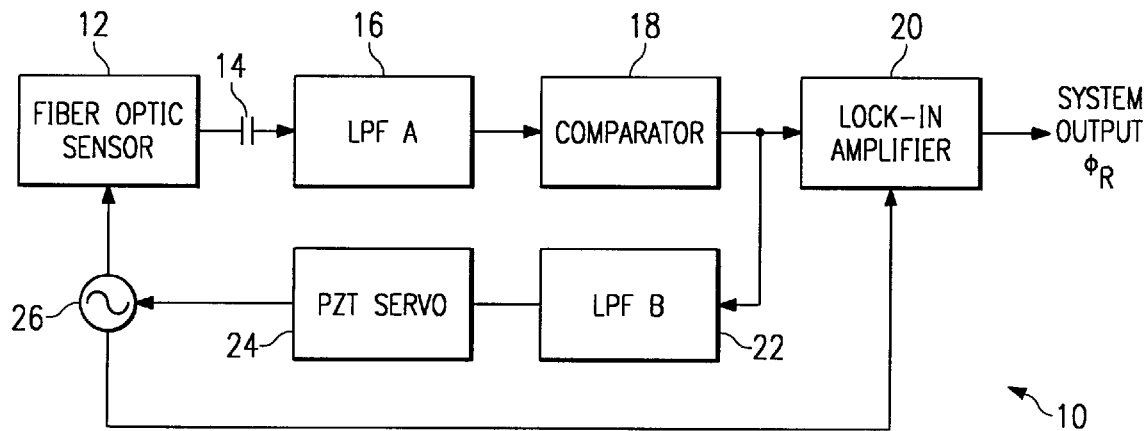
FIG. 1 is a simplified block diagram of an open loop signal processing circuit and method for a fiber optic interferometric sensor according to an embodiment of the present invention.
Figure 2A:
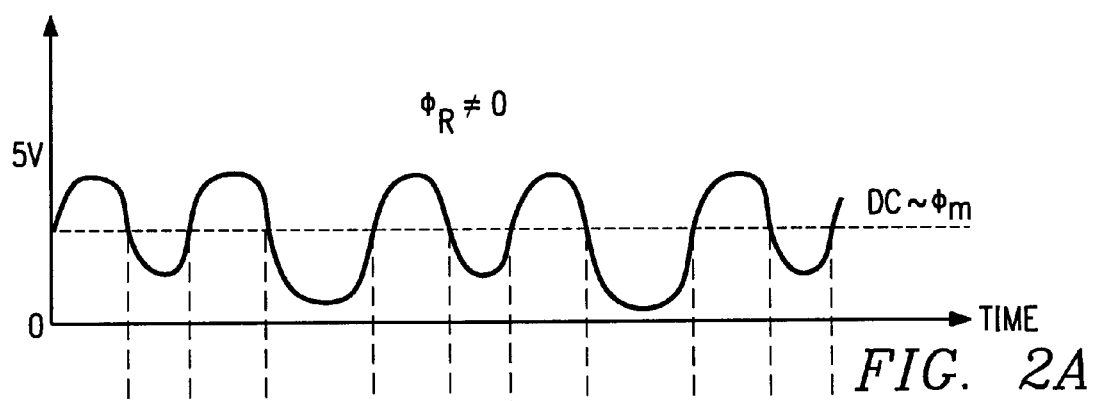
FIGS. 2A–2C are a diagram showing an exemplary output of the comparator circuit according to the teachings of the present invention.

FIG. 1 is a simplified block diagram of an embodiment of an open loop signal processing circuit 10 and method for a fiber optic interferometric sensor 12. Fiber optic sensor 12 is a sinusoidally modulated fiber optic sensor, and includes fiber gyroscopes, current sensors, flow sensors, and acoustic sensors. The detected output from fiber optic sensor 12 is a.c. coupled through a capacitor 14 (serving as a d.c. block) and provided to a low pass filter (LPF A) 16 having a corner or 3 dB frequency of approximately twice the modulation frequency. Low pass filter 16 performs the important function of reducing noise in the signal. It may be seen that capacitor 14 and low pass filter 16 can be integrated into the photodetector of fiber optic sensor 12 by using an operational amplifier (not shown) receiving the output from the photodetector, and having a predetermined RC constant in the feedback path of the operational amplifier, and a d.c. blocking capacitor in its input path. The output signal from low pass filter 16 contains mostly the first four harmonics of the original fiber optic sensor output signal. The relative amplitudes and phases of the remaining harmonics have been distinctly altered from the original fiber optic sensor output. An exemplary waveform representing the filtered signal is shown in FIG. 2A, where $\Phi_R \neq 0$.

Figure 2B:
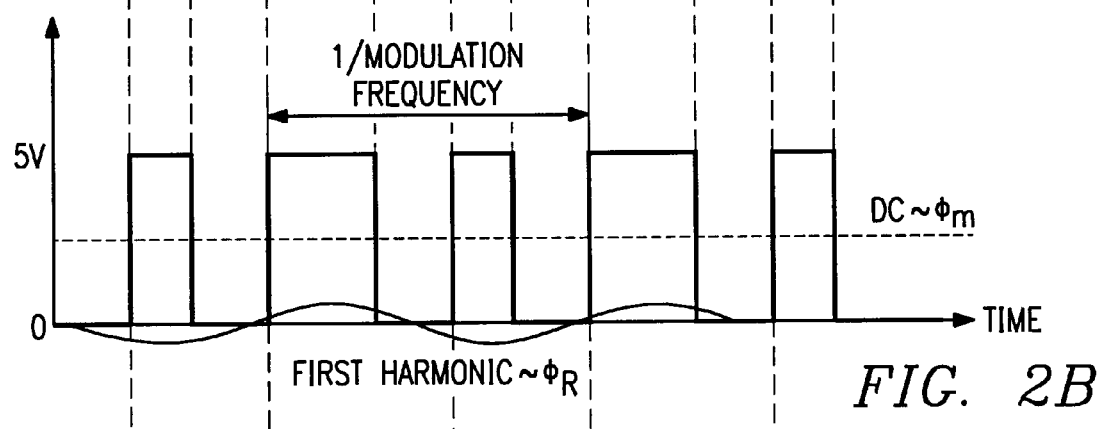

Next, the low pass filter output signal is provided to a comparator 18. Comparator 18 may be implemented, for example, by an operational amplifier (not shown) with its inverting input receiving the filtered signal, and its non-inverting input coupled to ground. An exemplary output of comparator 18 is shown in FIG. 2B. Every time the filtered signal crosses zero, the logic state of the comparator output signal changes. Alternatively, it may be seen that when implemented by the operational amplifier as described above, whenever the filtered signal crosses zero and becomes non-negative, the output from comparator 18 is low; whenever the filtered input crosses zero and becomes negative, the output from comparator 18 is high. The output of the comparator is hereinafter denoted as a "squared" signal (not in the mathematical sense, but in the sense of the waveform shape). The "squaring" of the signal in this manner removes the dependence on the intensity, $I_o$, of the fiber optic sensor output. The dominant frequency of the squared signal is at twice the modulation frequency. When a small phase shift is present in fiber optic sensor 12, the squared signal contains a first harmonic of the modulation frequency. The amplitude of this first harmonic component is directly proportional to the phase shift, $\Phi_R$. The output of comparator 18 is coupled to a lock-in amplifier or synchronous demodulator 20 which produces an output directly proportional to the phase shift.

Figure 3:
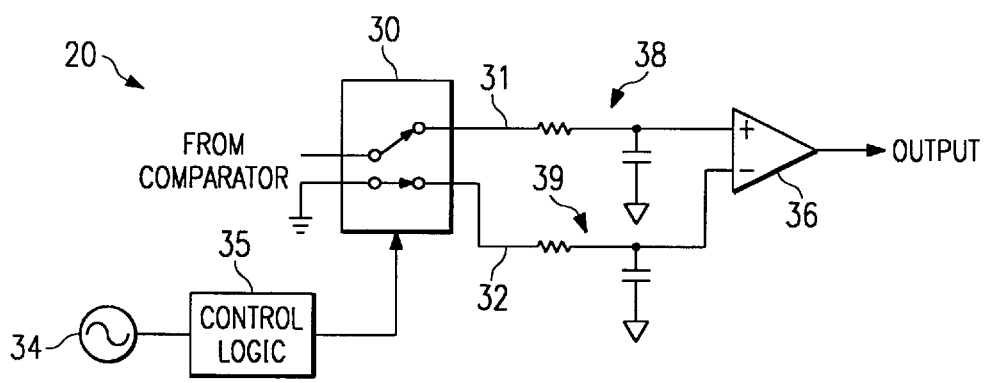
FIG. 3 is a more detailed diagram of an embodiment of the lock-in amplifier circuit according to the teachings of the present invention.
Figure 2C:
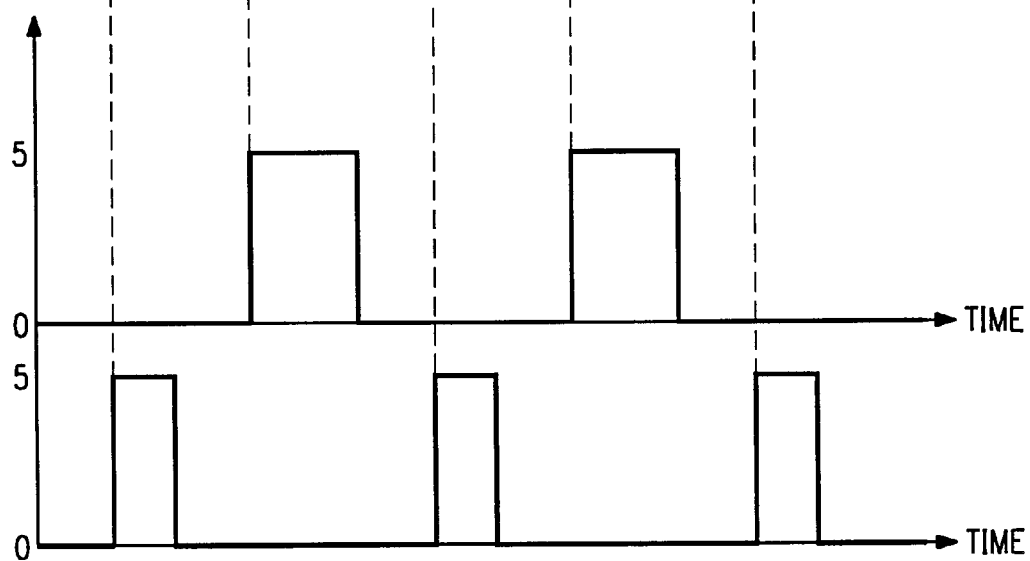

An exemplary implementation of lock-in amplifier 20 is shown in FIG. 3. The successive high states of the comparator output are split by a double pole-double throw switch 30 onto two lines 31 and 32 which feed the two inputs of a low-offset differential amplifier 36. It may be seen that whenever the input from the comparator is not connected to a line, that line is coupled to ground. Switch 30 is controlled by a control signal generated from an oscillator 26 used to generate modulating signals for fiber optic sensor 12. A control logic circuit 35 receives the oscillator output and generates the control signal necessary to cause switch 30 to switch at the proper times. Therefore, switch 30 swings between its two positions to give rise to the two signals or two sequential components on lines 31 and 32, as shown in FIG. 2C.

Low pass filters 38 and 39 are provided at the inputs of differential amplifier 36. Low pass filters 38 and 39 remove unwanted high frequency components of the split signals, and also determine the overall frequency response of the system. Differential amplifier 36 then generates a system output in response to the difference in the average value of the two split signals. In other words, the system output is indicative of the difference in duration between the two sequential components. In this manner, any asymmetry in the squared signal from comparator 18 gives rise to a DC voltage at the output of differential amplifier 36. Thus, the DC voltage at the output of differential amplifier 36 is proportional to the phase shift, $\phi_R$. Lock-in amplifier 20 possesses a particularly nice feature of being insensitive to even relatively large fluctuations in $\theta$.

In open loop fiber optic sensors which use piezoelectric (PZT) modulators, it is essential to control the modulation depth, $\Phi_m$, since the response of PZTs are quite temperature and time dependent. This is done by providing the output from comparator 18 to a low pass filter (LPF B) 22 and then provided to a piezoelectric servo 24 as shown in FIG. 1. The DC output from low pass filter 22 is to first order independent of the phase shift, $\phi_R$, and only depends on the modulation depth. Piezoelectric servo 24 thus sets the amplitude of the piezoelectric drive (not shown) so that this DC voltage remains at its target value.

It may be seen that low pass filter 16 serves the important function of noise reduction. The asymmetry in the squared signal from comparator 18 is approximately equally sensitive to noise from all the odd harmonics of the modulation frequency. However, the rotation rate signal is mainly present in the first and third harmonics. This makes it necessary to roll-off the higher harmonics. The use of low pass filter 16 to filter the fiber optic sensor output signal may induce a sensitivity to quadrature errors, such as those caused by polarization modulation in the piezoelectric and other spurious modulator effects, and may also result in scale factor changes when the filter component values drift.

When the bandwidth of the photodetector (not shown) in fiber optic sensor 12 is wide enough to preserve the relative amplitudes and phases of the various significant harmonics that are present in the fiber optic sensor output signal, then the squared signal processing yields an output that is independent of any spurious signal that exists in quadrature to the signal to be detected. However, the introduction of low pass filter 16 changes the relative phase relationships between the various harmonics and thereby gives rise to an unwanted sensitivity to quadrature errors. It has been shown that a preferred filter roll-off frequency of twice the modulation frequency gives rise to a quadrature sensitivity that is equivalent to a 7° error in the phase setting of a synchronous demodulator.

The scale factor of fiber optic sensor 12 which uses the squared signal processing depends on the relationship between the response of the electronics to the various harmonics present in the fiber optic sensor output signal. When low pass filter 16 changes unknowingly, errors occur in both piezoelectric servo 24 and in the scale factor response of the squared signal from comparator 18. Fortunately, these two errors are somewhat self compensating so that the overall requirements on the stability of low pass filter 16 is not that critical. For example, for a filter roll-off frequency of twice the modulation frequency and a modulation depth of 2.5 radians, the scale factor changes by 0.13% for every 1% change in the roll-off frequency. In general, it is preferable for the filter roll-off frequency to be between 1 to 5 times the modulation frequency.

The dynamic range of open loop signal processing circuit 10 and scheme of the present invention is limited by the fact that certain zero-crossings of the filtered fiber optic sensor signal cease to exist in the presence of large phase shifts. Using a modulation depth of 2.5 radians and a filter of twice the modulation frequency as suggested above, the maximum detectable phase shift is about 0.7 radians. Since phase shifts well below 1 $\mu$rad are detectable using this technique, this system still yields more than six orders of magnitude of useful dynamic range, which is suitable for a very large number of applications.

It may be seen that the functions performed by lock-in amplifier 20 may also be implemented in a phase sensitive detector. The phase sensitive detector receives the squared signal from comparator 18 and multiplies it by a sine wave and integrates. The output of the phase sensitive detector is proportional to the measured signal.

Further, low pass filter 22 may also be implemented by a double integrator circuit, commonly constructed as two concatenated operational amplifiers (not shown) with predetermined integration time constants.

In effect, the present invention pre-filters the sensor output signal to remove noise, squares the filtered signal and, based on at least four zero crossings in the squared signal (yielding two squared waveforms of varying duration), synchronously demodulates the squared signal. The result is a system output signal that is indicative of the phase shift occurring between two light waves propagating in the fiber optic sensor caused by some ambient effect, such as rotation, current, magnetic field, sound, pressure, etc.

The present invention yields a new low-cost, low component count demodulation scheme for open loop fiber optic sensors. The scheme provides a signal to noise performance that is within 50% of the optimum obtainable for intensity noise limited sinusoidally modulated fiber optic sensors. No noticeable degradation in the bias drift was seen to be induced by the electronics. Finally, based on computed values of the sensitivity of the system to input filter errors, a temperature compensated scale factor stability of 1000 ppm or better is readily achievable using this technique.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A signal processing circuit for a fiber optic sensor, comprising:

a d.c. block coupled to the fiber optic sensor adapted to remove d.c. components from an fiber optic sensor output signal;

a low pass filter coupled to the d.c. block and adapted to reduce noise in the fiber optic sensor output signal and generate a filtered signal;

a comparator coupled to the low pass filter adapted to generate a square signal indicative of zero crossings in the filtered signal; and a lock-in amplifier coupled to the comparator and adapted to generate a system output signal indicative of a phase shift in the fiber optic sensor in response to the square signal.

2. The signal processing circuit, as set forth in claim 1, wherein the lock-in amplifier comprises:

a switch receiving the square signal and adapted to differentiate between a first and a second sequential components of the square signal; and a differential amplifier receiving the first sequential component of the square signal at a first input, and receiving the second sequential component of the square signal at a second input, and generating the system output signal in response to the difference in duration between the first and second sequential components.

3. The signal processing circuit, as set forth in claim 1, further comprising a second low pass filter receiving the square signal from the comparator and generating a second filtered output indicative of a modulation depth used to control a phase modulator in the fiber optic sensor.

4. The signal processing circuit, as set forth in claim 1, wherein the d.c. block is a capacitor.

5. The signal processing circuit, as set forth in claim 1, wherein the d.c. block and low pass filter are integrated with a photodetector in the fiber optic sensor.

6. The signal processing circuit, as set forth in claim 5, wherein the low pass filter comprises an operational amplifier with parallel capacitor and resistor coupled across an input and the output thereof, and the d.c. block comprises a capacitor coupled to an input of the operational amplifier.

7. The signal processing circuit, as set forth in claim 1, wherein the low pass filter has a 3 dB frequency of approximately twice the modulation frequency of a phase modulator in the fiber optic sensor.

8. The signal processing circuit, as set forth in claim 1, wherein the low pass filter has a 3 dB frequency of between 1 and 5 times the modulation frequency of a phase modulator in the fiber optic sensor.

9. The signal processing circuit, as set forth in claim 1, wherein the lock-in amplifier generates the system output signal indicative of a phase shift in the fiber optic sensor due to the Sagnac effect.

10. The signal processing circuit, as set forth in claim 1, wherein the lock-in amplifier generates the system output signal indicative of a phase shift in the fiber optic sensor due to the Faraday effect.

11. The signal processing circuit, as set forth in claim 1, wherein the lock-in amplifier generates the system output signal indicative of a phase shift in the fiber optic sensor caused by a magnetic field.

12. A method for processing the detected signal from a fiber optic interferometer, comprising the steps of:

removing d.c. components from the detected signal;

low pass filtering noise from the output signal and generating a filtered signal;

comparing the filtered signal with zero and generating a square signal; and synchronously demodulating the square signal and generating a system output signal indicative of a phase shift in the fiber optic interferometer.

13. The method, as set forth in claim 12, wherein the filtering step comprises the step of removing high frequency signals from the detected signal.

14. The method, as set forth in claim 12, wherein the filtering step comprises the step of passing only a first few harmonics of the detected signal.

15. The method, as set forth in claim 9, wherein the filtering step comprises the step of passing only the first four harmonics of the detected signal.

16. The method, as set forth in claim 9, wherein the synchronous demodulating step comprises the steps of:

differentiating two sequential components of the square signal;

comparing the duration difference between the two sequential components of the square signal; and generating the system output signal in response to the duration difference.

17. The method, as set forth in claim 12, further comprising the step of low pass filtering the squared signal and generating a modulation depth signal for controlling a phase modulator in the fiber optic interferometer.

18. The method, as set forth in claim 12, further comprising the step of low pass filtering the square signal and generating a modulation depth signal for controlling a piezoelectric modulator in the fiber optic interferometer.

19. The method, as set forth in claim 12, wherein the synchronous demodulating step comprises the step of generating the system output signal in response to a phase shift in the fiber optic interferometer due to the Sagnac effect.

20. The method, as set forth in claim 12, wherein the synchronous demodulating step comprises the step of generating the system output signal in response to a phase shift in the fiber optic interferometer due to the Faraday effect.

21. The method, as set forth in claim 12, wherein the synchronous demodulating step comprises the step of generating the system output signal in response to a phase shift in the fiber optic interferometer caused by a magnetic field.

22. A method of processing a fiber optic sensor output signal, comprising the steps of:

low pass filtering the sensor output signal to remove noise;

generating a square signal from the filtered signal based on zero crossings in the filtered signal; and synchronously demodulating the square signal.

23. The method, as set forth in claim 22, wherein the square signal generating step comprises the steps of:

detecting a first zero crossing in the filtered signal and generating the square signal having a first logic state in response thereto;

detecting a second zero crossing in the filtered signal and changing the square signal to a second logic state in response thereto, the square signal forming a first square waveform having a first width;

detecting a third zero crossing in the filtered signal and changing the square signal to the first logic state in response thereto; and detecting a fourth zero crossing in the filtered signal and changing the square signal to the second logic state in response thereto, the square signal forming a second square waveform having a second width.

24. The method, as set forth in claim 23, wherein the synchronously demodulating step comprises the step of determining a difference in the average value of the first and second square waveforms.

25. The method, as set forth in claim 23, wherein the synchronously demodulating step comprises the step of determining a difference in the first and second widths of the first and second square waveforms.

26. The method, as set forth in claim 22, further comprising the step of low pass filtering the square signal and generating a modulation depth signal for controlling a piezoelectric modulator in the fiber optic sensor.

* * * * *

UNITED STATES PATENT AND TRADEMARK OFFICE
CERTIFICATE OF CORRECTION

PATENT NO. : 5,978,084
DATED : November 2, 1999
INVENTOR(S) : James N. Blake

It is certified that error appears in the above-identified patent and that said Letters Patent is hereby corrected as shown below:

Title page, item [56], insert--DE 195 1712128A1   11/1996   Deutschland--.

Signed and Sealed this

Fifth Day of December, 2000

Attest:

Q. TODD DICKINSON

*Attesting Officer*  *Director of Patents and Trademarks*